(12) United States Patent
Kitamura et al.

(10) Patent No.: US 7,837,391 B2
(45) Date of Patent: Nov. 23, 2010

(54) BEARING RETAINER UNIT AND ELECTRIC MOTOR FURNISHED THEREWITH

(75) Inventors: Hideaki Kitamura, Kyoto (JP); Takahiro Kikuichi, Kyoto (JP); Fumihiro Umeda, Kyoto (JP); Yoshihisa Kato, Kyoto (JP); Koji Ando, Kyoto (JP)

(73) Assignee: Nidec Corporation, Kyoto (JP)

( * ) Notice: Subject to any disclaimer, the term of this patent is extended or adjusted under 35 U.S.C. 154(b) by 1075 days.

(21) Appl. No.: 11/532,109

(22) Filed: Sep. 15, 2006

(65) Prior Publication Data

US 2007/0065064 A1  Mar. 22, 2007

(30) Foreign Application Priority Data

Sep. 16, 2005 (JP) ............................. 2005-271113

(51) Int. Cl.
*F04D 29/056* (2006.01)
(52) U.S. Cl. .................. 384/537; 384/510; 384/520; 384/535; 249/63; 249/64; 264/318; 425/577; 415/229
(58) Field of Classification Search ................ 384/114, 384/276, 279, 295, 296, 510, 520, 535–537; 415/229; 361/695; 310/43, 45, 67 R; 417/354, 417/423.12; 264/267, 273, 275, 318; 425/577; 249/63, 64
See application file for complete search history.

(56) References Cited

U.S. PATENT DOCUMENTS

| 3,802,443 | A  | * | 4/1974  | Morane ...................... 132/245 |
| 4,685,871 | A  | * | 8/1987  | Harwath .................. 418/206.1 |
| 4,938,802 | A  | * | 7/1990  | Noll et al. ................... 106/38.9 |
| 5,068,065 | A  | * | 11/1991 | Maus et al. ................ 264/1.33 |
| 5,167,898 | A  | * | 12/1992 | Luther ...................... 264/328.1 |
| 6,471,902 | B1 | * | 10/2002 | Snyder ....................... 264/294 |
| 6,729,764 | B2 | * | 5/2004  | Kobayashi et al. .......... 384/295 |
| 7,484,931 | B2 |   | 2/2009  | Ku et al. |
| 2002/0061145 | A1 | * | 5/2002 | Kobayashi et al. .......... 384/276 |
| 2003/0160530 | A1 | * | 8/2003 | Horng et al. .................. 310/91 |
| 2006/0013686 | A1 | * | 1/2006 | Ku et al. ..................... 415/220 |

* cited by examiner

*Primary Examiner*—Richard W Ridley
*Assistant Examiner*—Thomas Diaz
(74) *Attorney, Agent, or Firm*—Volentine & Whitt, PLLC

(57) ABSTRACT

A bearing retainer unit is formed by an insert-molding technique to cast a molded component of the bearing retainer unit utilizing a bearing bushing. A first mold die, having a circumferential surface shaped to correspond to at least a portion of the inner circumferential surface of a bearing-positioning portion of the molded component, and a second mold die, having an abutment that abuts against an axial end face of the first die, are readied. A molten material is then injected into the mold to form the molded part, thereby forming the die-parting line on the inner circumferential surface of the component's bearing positioning portion, positioned at the radially outer side of the abutment.

23 Claims, 15 Drawing Sheets

BEARING RETAINER UNIT AND ELECTRIC MOTOR FURNISHED THEREWITH

BACKGROUND OF THE INVENTION

1. Technical Field

The present invention relates to bearing retainer units provided with a bearing bushing that anchors a bearing mechanism made up of upper- and lower-end bearings, and to electric motors furnished with such bearing retainer units.

2. Description of the Related Art

Motors furnished with a metal bearing bushing for anchoring upper-/lower-end bearing-equipped bearing mechanisms are known. For example, impeller-encompassing fan housings are formed, from synthetic resin, integrally with a motor support part for supporting the motor, and a cylindrical metal bearing liner is insert-molded into the motor support part. An upper-end bearing and a lower-end bearing, for rotatably supporting the rotor component of the motor, are fixed to the inner circumferential surface of the bearing liner, while the stator component of the motor is fixed to the outer circumferential surface of the bearing liner.

Along the inner periphery of the bearing liner, a projecting part that supports the upper- and lower-end bearings is by a pressing operation formed extending radially from the bearing-liner inner periphery. A consequence of this method is that precision-forming the projecting part is difficult. Furthermore, the excessive stress that acts on the bearing liner in press-forming the projecting part can compromise the roundness of the cylindrical bearing liner, leading to the bearings or stator being installed tilted.

Lack of precision in the bearing liner components leads to canted rotation of the rotor, such that noise issues from the bearings, and gives rise to the problem of excess load being placed on the bearings, decreasing their lifespan.

Thus, due to the bearing liner and the projecting part being produced by press-forming in a pressing operation, improving the precision of the bearing liner components, and the precision of the motor rotation, has been elusive.

BRIEF SUMMARY OF THE INVENTION

In one example of the bearing retainer unit of the present invention, the bearing retainer unit is formed by an insert molding method using at least a pair of mold dies that includes a first die and a second die, and the bearing retainer unit is used in an electric motor provided with a rotor that rotates centered on its rotational axis.

The bearing retainer unit includes a metal bearing bushing and a molded part. The bearing bushing is formed cylindrically, and its cylindrical surface has a communicating hole whereby the inside and outside of the cylinder communicate. The molded part includes a molded cylinder portion, a cylindrical bearing positioning portion that along the inner side of the bushing covers its inner surface, and a linking portion that links the molded cylinder portion and the bearing positioning portion.

The bearing bushing is positioned in the internal space formed by the pair of mold dies, and the first die, which has a circumferential surface shaped to correspond to at least part of the inner circumferential surface of the bearing positioning portion, and the second die, which has an abutment lent a form to correspond to an axial end face of the first die, are closed, readying the mold.

Then, a molten material is injected into the internal space to form the molded part, thereby forming the parting line on the inner circumferential surface of the bearing positioning portion, positioned at the radially outer side of the abutment.

Another bearing retainer unit of the present invention is provided with a metal bearing bushing and a molded part. The bearing bushing is formed cylindrically, and in its cylindrical surface has a communicating hole whereby the inside and outside of the cylinder communicate. The molded part is provided with a molded cylinder portion, a cylindrical bearing positioning portion that along the inner side of the bushing covers its inner surface, and a linking portion that links the molded cylinder portion and the bearing positioning portion.

The bearing bushing is positioned in the internal space formed by the pair of mold dies, and the first die, which has a constricted circumferential surface, and the second die, which has an abutment lent a form to correspond to an axial end face of the first die, with the constricted circumferential surface of the first die therein being tapered heading toward the abutment along the inner surface of the bearing bushing are closed, readying the mold.

Then, a molten material is injected into the internal space to form the molded part, thereby forming a tapered bore in the bearing positioning portion.

Still another bearing retainer unit of the present invention is provided with a metal bearing bushing and a molded part. The bearing bushing is formed cylindrically, and in its cylindrical surface has a communicating hole whereby the inside and outside of the cylinder communicate. The molded part is provided with a molded cylinder portion, a cylindrical bearing positioning portion that along the inner side of the bushing covers its inner surface, and a linking portion that links the molded cylinder portion and the bearing positioning portion.

The bearing bushing is positioned in the internal space formed by the pair of mold dies, and the first die, which has a circumferential surface shaped to correspond to at least part of the inner circumferential surface of the bearing positioning portion, and the second die, which has an abutment lent a form to correspond to an axial end face of the first die, are closed, readying the mold.

A molten material is then injected into the internal space to form the molded part, thereby forming a bearing-positioning-part upper-edge portion, and an upper recess is that is located in the outer circumferential margin of, and indents downward from, the upper edge portion.

The present invention enables anchoring the bearings into the bearing positioning portion easily and with high precision. Accordingly, it is possible to realize high-precision and superiorly reliable bearing retainer units, and motors provided with such bearing retainer units.

It should be understood that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated.

Other features, elements, steps, advantages and characteristics of the present invention will become more apparent from the following detailed description of preferred embodiments thereof with reference to the attached drawings.

BRIEF DESCRIPTION OF THE SEVERAL VIEWS OF THE DRAWINGS

FIG. 8 illustrates a method for machining the bearing bushing in FIG. 1, wherein

FIG. 11 depicts key portions of a motor bearing bushing according to a fourth embodiment of the present invention, wherein

DETAILED DESCRIPTION OF THE INVENTION

Below, embodiments of a motor having the bearing retainer unit of the present invention are described in detail. The basic configuration in the second through eighth embodiments is the same as in the first embodiment, and therefore the explanation focuses on the portions that differ.

First Embodiment

Figure 1:
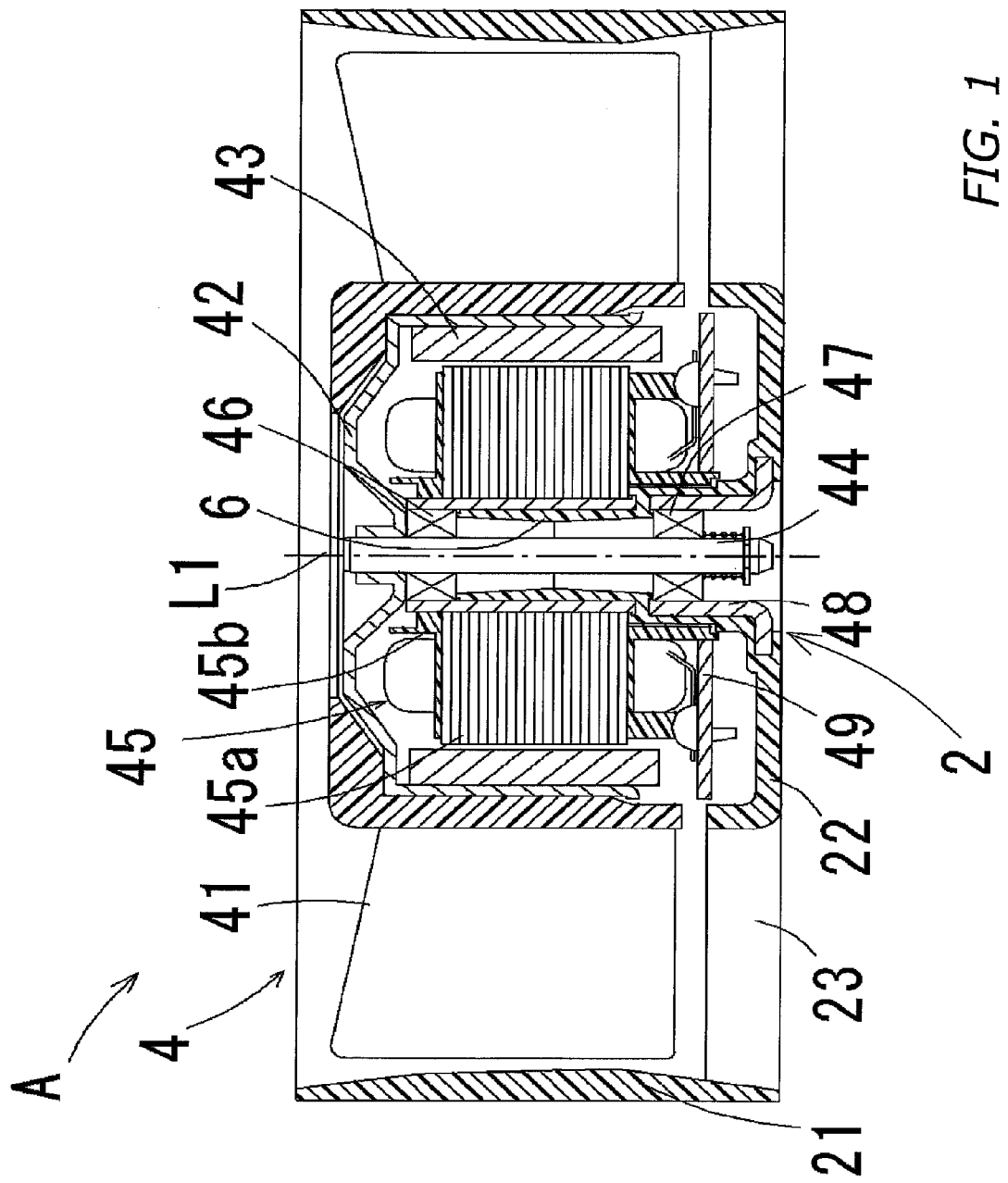
FIG. 1 is an overall sectional view depicting a motor according to a first embodiment of the present invention.

As shown in FIG. 1, fan motor A is provided with a motor 4 equipped with an impeller inside of a fan housing 21. The fan is an axial flow fan in which airflow induced by rotation of an impeller 41 passes through the inside of the fan housing 21, and flows in from one side in the direction of the axis and is discharged from the other side. An axial flow fan is shown in the first embodiment, but the present invention can also be applied in a centrifugal fan. In FIG. 1, straight line L1 indicates the rotational axis of the motor, wherein "axial" orientation means the path along which the rotational axis L1 extends.

The motor 4 is provided with a rotor, a stationary section, and a bearing mechanism that supports the rotor. The rotor is provided with the impeller 41, a cup-shaped yoke 42 formed from magnetic material fixed to the inside of the impeller 41, a magnet 43 fixed to the inside of the yoke 42, and a shaft 44 fixed in the center of the yoke 42.

The stationary section is furnished with: a stator 45 that radially opposes the magnet 43; a bearing bushing 48 on the outer periphery of which the stator 45 is supported, and on the inner periphery of which an upper bearing 46 and a lower bearing 47 are respectively supported; and a circuit board 49.

The bearing mechanism includes the upper bearing 46 and the lower bearing 47, and rotatably supports the rotor. The upper bearing 46 and the lower bearing 47 are ball bearings, and a preload is applied to them by a spring provided in the bottom end portion of the shaft 44. It will be appreciated that sliding bearings can also be employed for the upper bearing 46 and the lower bearing 47.

A configuration in which a yoke provided with a driving magnet is fixed inside an impeller-mounting cup-like member, wherein the cup-like member is formed integrally with the impeller and a shaft is provided in the center thereof, can also be employed. Also, in the stator 45, insulators 45b, formed of synthetic resin, are mounted along the top/bottom of a stator core 45a having a through-hole penetrating its midportion and being formed by laminating silicon steel plates; and the coils are wound via this structure.

Figure 2:
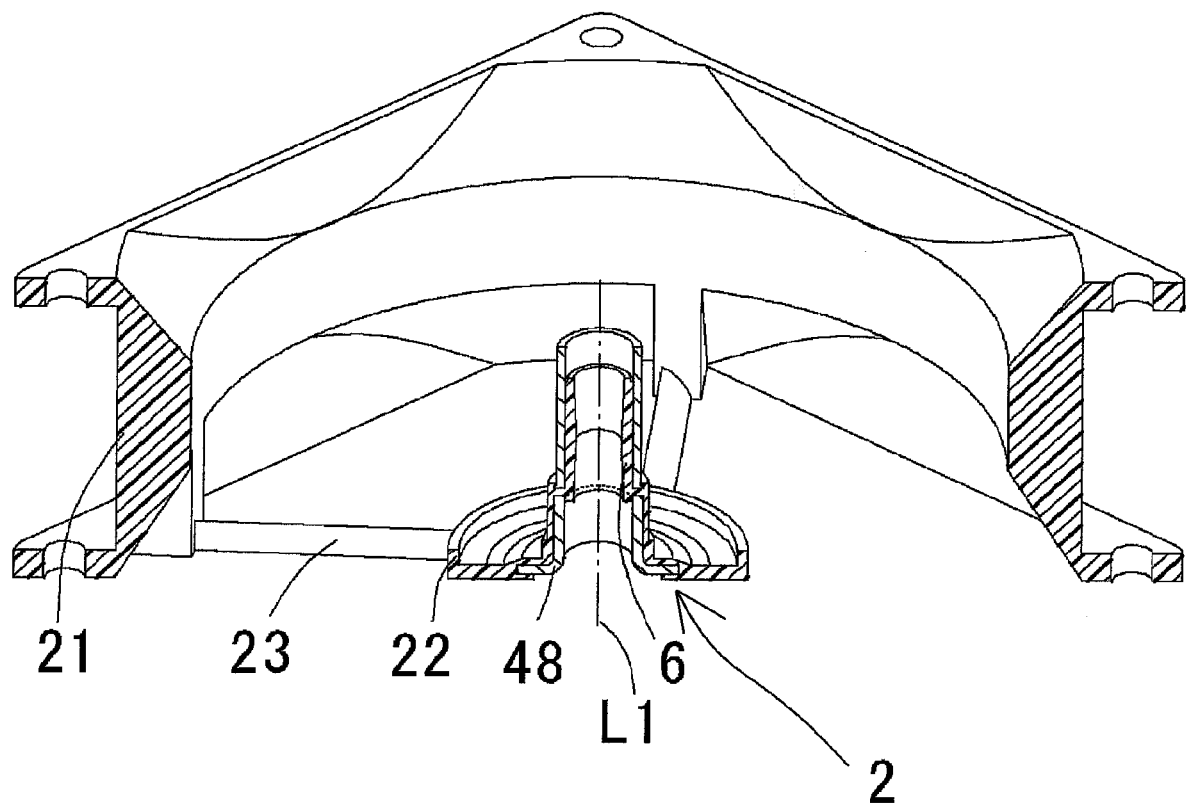
FIG. 2 is a partly-in-section, oblique view illustrating key portions of the motor in FIG. 1.

As shown in FIG. 2, the fan housing 21 is formed in a rectangular shape having an inner circumferential surface that surrounds the impeller 41. In the inside center of the fan housing 21, a circular disk-shaped motor support portion 22 that supports the bearing bushing 48 of the impeller-attached motor 4, and a plurality of linking portions 23 that extend in an approximately radial shape and support the motor support portion 22, are provided. The fan housing 21, the motor support portion 22, and the linking portions 23 are formed as a single body with injection molding using synthetic resin. A gap between the fan housing 21 and the motor support portion 22 is an exhaust port for the fan motor A.

The motor support portion 22 is fastened to the metal bearing bushing 48 by insert molding. On the inner circumferential surface of the bearing bushing 48 a synthetic resin bearing positioning portion 6 is provided. The upper bearing 46 makes contact with and is fixed to an upper edge portion 61 of the bearing positioning portion 6, and the lower bearing 47 makes contact with and is fixed to a lower edge portion 62 of the bearing positioning portion 6. The bearing positioning portion 6 is formed when insert molding the bearing bushing 48 to the motor support portion 22. That is, as shown in FIG. 2, with this motor 4, a bearing retainer unit 2 is configured such that the bearing bushing 48, the fan housing 21, the motor support portion 22, the linking portions 23, and the bearing positioning portion 6 are made a single body.

Following is a detailed description of the bearing retainer unit 2.

Figure 3:
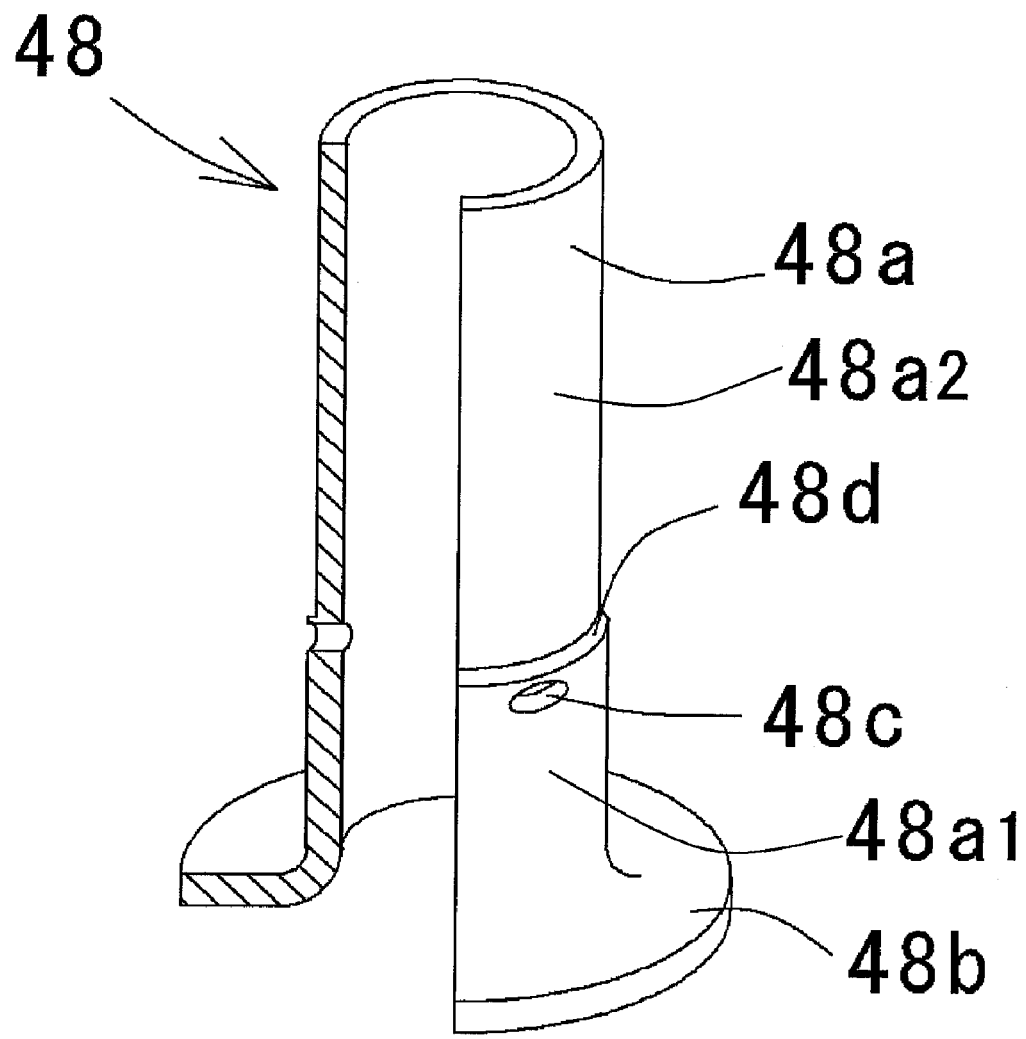
FIG. 3 is a partly-in-section, oblique view illustrating a bearing bushing from the motor in FIG. 1.

The bearing bushing 48 is formed by press processing such as deep draw processing of a metal member. As shown in FIG. 3, the bearing bushing 48 is provided with a cylinder portion 48a and a flange portion 48b. The upper bearing 46 and the lower bearing 47 are held by the inner circumferential portion of the cylinder portion 48a, and the stator 45 is held by the outer circumferential portion. In the cylinder portion 48a, a plurality of communicating holes 48c are formed that are in communication with the bushing inner surface and the bushing outer surface of the cylinder portion 48a.

A stepped portion 48d projecting in the radial direction from the bushing outer surface of the cylinder portion 48a is provided on the bottom side of the cylinder portion 48a. The inner surface of the cylinder portion 48a is formed with a flush shape in the direction of the axis. The dimension of the outer diameter of the stepped portion 48d is more than the dimension of the outer diameter of the outer circumferential portion of the top side of the cylinder portion 48a. That is, the average value of the outer dimension of a first outer surface 48$a$1 below the stepped portion 48$d$ is more than the average value of the outer dimension of a second outer surface 48$a$2 above the stepped portion 48$d$. The plurality of communicating holes 48$c$ are provided in a region below the stepped portion 48$d$ and disposed uniformly at four locations on the cylinder (only two locations are shown in FIG. 3). The bearing bushing 48 may also be formed by cutting processing.

Figure 4:
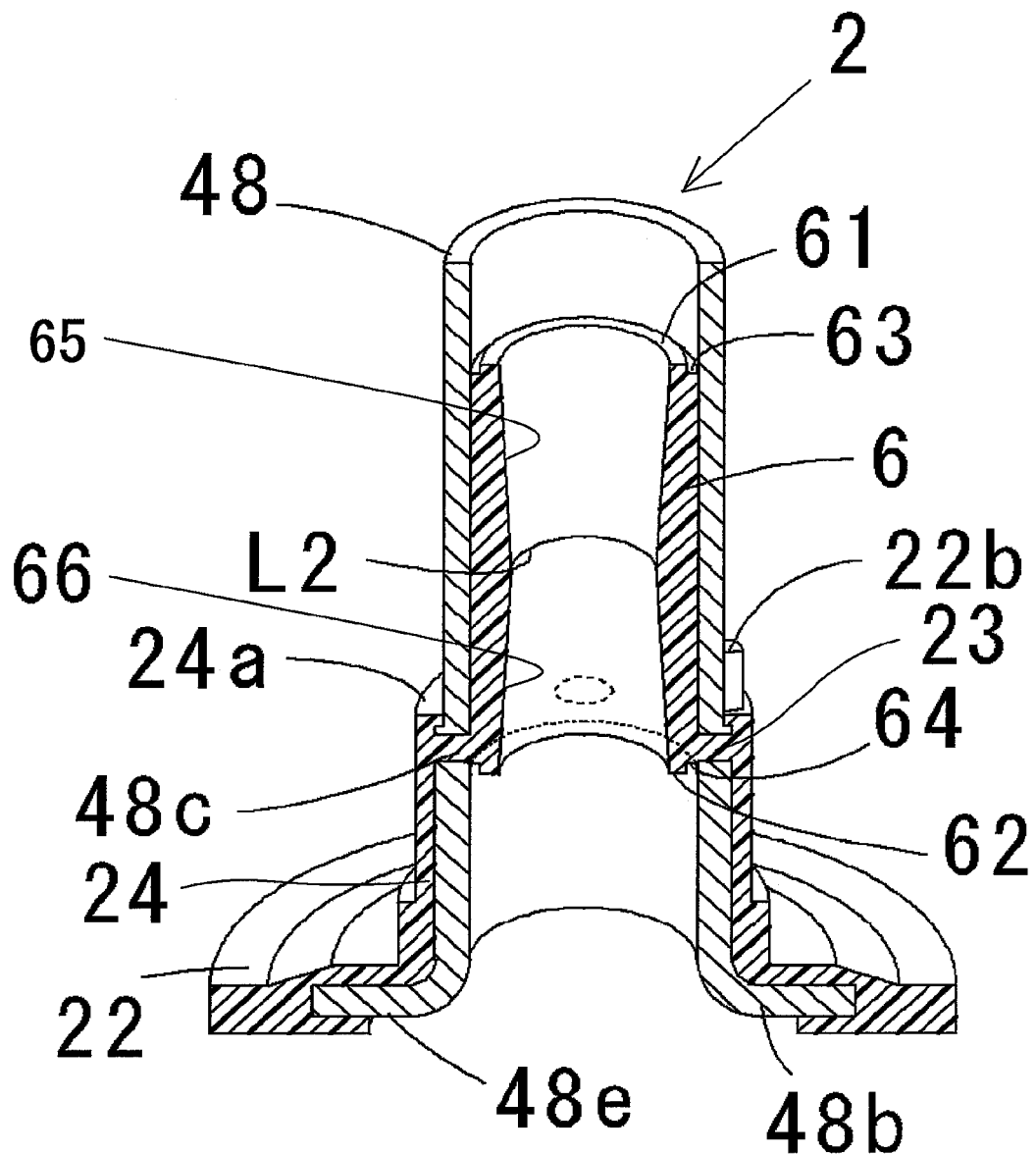
FIG. 4 is a vertical sectional view illustrating a bearing retainer unit from FIG. 1.
Figure 5:
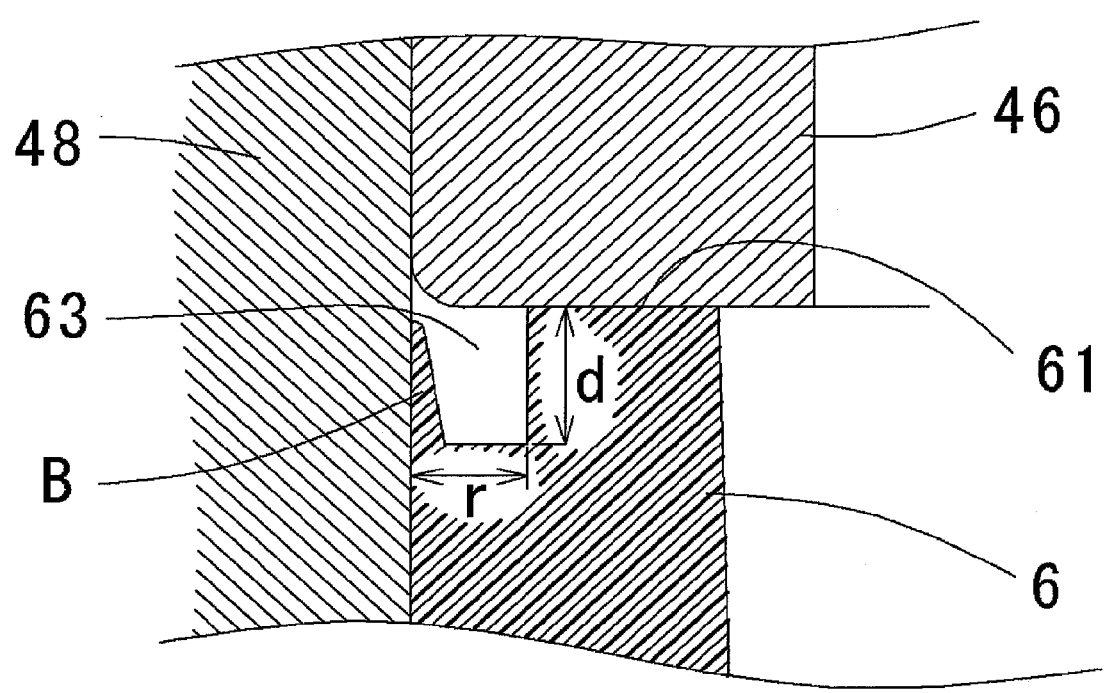
FIG. 5 is an enlarged sectional view illustrating a bearing positioning portion from FIG. 1.

As shown in FIG. 4, the bearing retainer unit 2 is provided with a molded cylinder portion 24 that faces toward a flange portion 48$b$ from the outer circumferential surface somewhat above the stepped portion 48$d$ of the cylinder portion 48$a$, the linking portions 23 that close off and seal the communicating holes 48$c$, and the aforementioned bearing positioning portion 6 that covers the inner circumferential surface of the bearing bushing 48. The motor support portion 22 is formed such that it covers all of the top face and outer circumferential surface of the flange portion 48$b$ and part of the bottom face of the flange portion 48$b$. A cylinder-portion upper edge portion 24$a$ of the molded cylinder portion 24 that covers the bottom side outer circumferential surface of the cylinder portion 48$a$ is formed in a ring-like shape as a horizontal face perpendicular to the direction of the axis. Each communicating hole 48$c$ is obstructed by the bearing positioning portion 6, the linking portions 23, and the molded cylinder portion 24, so the communicating holes 48$c$ are not exposed to the outside air. Also, an external-air exposed portion 48$e$ exposed to the outside air is formed on the radially inner side of the flange portion 48$b$.

The stator 45 is fit to the outer circumferential surface of the bearing bushing 48 and fixed by bonding, mounted to the cylinder-portion upper edge portion 24$a$ of the molded cylinder portion 24, and thus positioned. The top inner circumferential wall of the insulator 45$b$ is lightly pressed into the outer peripheral face of the cylinder portion 48$a$. Thus, when fixing the stator 45 to the bearing bushing 48 by bonding, even if the adhesive is not hardened, the stator 45 is temporarily attached to the bearing bushing 48. With process steps such as temporarily holding the stator 45 using a jig or the like, or temporarily storing the stator 45 until the adhesive hardens, being therefore unnecessary, the stator 45 installation operation is made efficient.

Further, as shown in FIG. 4, a protrusion 22$b$ that protrudes in the direction of the axis is provided as a single body with the cylinder-portion upper edge portion 24$a$ of the molded cylinder portion 24. The protrusion 22$b$ is housed by a notched groove (not shown) provided in the inner circumferential surface of the stator core 45$a$, and functions as a positioner and rotation stopper that positions the stator 45 at a predetermined position in the direction of rotation.

Heat produced at the stator 45 is released via the bearing bushing 48, and the release of heat is enhanced because the external-air exposed portion 48$e$ is present on the bottom face of the flange portion 48$b$. It is desirable to secure as wide a space as possible for the external-air exposed portion 48$e$, in a range that the joint strength of the bearing bushing 48 and the motor support portion 22 is not hindered. The external-air exposed portion 48$e$ is suitable for releasing heat because it is at a location in the fan motor A that is easily exposed to the outside air.

As shown in FIG. 4, the bearing positioning portion 6 is formed in a cylindrical shape, and along with being connected to the linking portion 23 that seals each communicating hole 48$c$, is formed extended upward such that it covers the bushing inner surface. The positioning portion upper edge portion 61 and the positioning portion lower edge portion 62 of the bearing positioning portion 6 are formed in a ring-like shape as flat faces perpendicular to the direction of the axis.

The bottom end face of the upper bearing 46 makes contact with the upper edge portion 61, and thus the upper bearing 46 is positioned at a predetermined position in the direction of the axis. The upper end face of the lower bearing 47 makes contact with the lower edge portion 62, and thus the lower bearing 47 is positioned at a predetermined position in the direction of the axis. The upper edge portion 61 and the lower edge portion 62 are formed at a position in the axial direction that neither the bearing 46 or the bearing 47 protrudes from the bearing bushing 48 when the upper bearing portion 46 and the lower bearing portion 47 have been positioned. The positioning of both the bearing 46 and the bearing 47 can also be performed via, for example, a spring or a spacer in the upper edge portion 61 and the lower edge portion 62.

As shown in FIG. 4, an annular upper recess 63 that indents downward from the upper edge portion 61 is formed in the outer circumferential margin of the upper edge portion 61 of the bearing positioning portion 6. Likewise, an annular lower recess 64 that indents upward from the lower edge portion 62 is formed in the outer circumferential margin of the lower edge portion 62 of the bearing positioning portion 6. Because the upper recess 63 and the lower recess 64 are formed in the outer circumferential margins of the upper edge portion 61 and the lower edge portion 62, even if a burr B is formed between the inner surface of the bushing and the outer circumferential surface of the bearing positioning portion 6, the burr B is formed within the upper recess 63 and the lower recess 64. The length of the burr B in the axial direction is shorter than the length from the bottom face of the upper recess 63 to the upper edge portion 61 in the axial direction. That is, the burr B does not protrude upward from the upper end face 61. This is also true for a burr within the lower recess 64.

As a result, because the burr B does not protrude from the upper edge portion 61 and the lower edge portion 62, it does not interfere when the upper bearing 46 and the lower bearing 47 make contact with the upper edge portion 61 and the lower edge portion 62. It is possible to perform positioning of the upper bearing 46 and the lower bearing 47 in the direction of the axis with high precision. In this case, with respect to the volume of the upper recess 63 and the lower recess 64, it is preferable that depth d and width r are set as large as possible, while insuring a surface area sufficient for positioning to be possible by the bearings 46 and 47 making contact with the upper edge portion 61 and the lower edge portion 62. Here, the shape of the upper recess 63 and the lower recess 64 is rectangular in cross-section, but various other shapes may also be adopted, such as an approximately triangular shape.

If the bearing bushing 48 and the injection molding die are formed as designed, burrs will not occur. However, it becomes more difficult to prevent the occurrence of burrs due to errors in the constituent components or die abrasion, or molding conditions, as the number of pieces produced increases. It is possible to decrease the occurrence of burrs by strictly controlling the component precision of the bearing bushing 48 and shortening the period for changing dies, but this leads to an increase in cost.

On the other hand, with the present embodiment, by providing the upper recess 63 and the lower recess 64 as stated above, even if burrs occur there is no effect on positioning of the bearings. That is, with the present embodiment, by adopting a configuration in which the occurrence of burrs is permitted to some extent, it is possible to relax the precision of each component and also to extend the period for changing dies, so that it is possible to produce a bearing retainer unit without increased cost.

Figure 6:
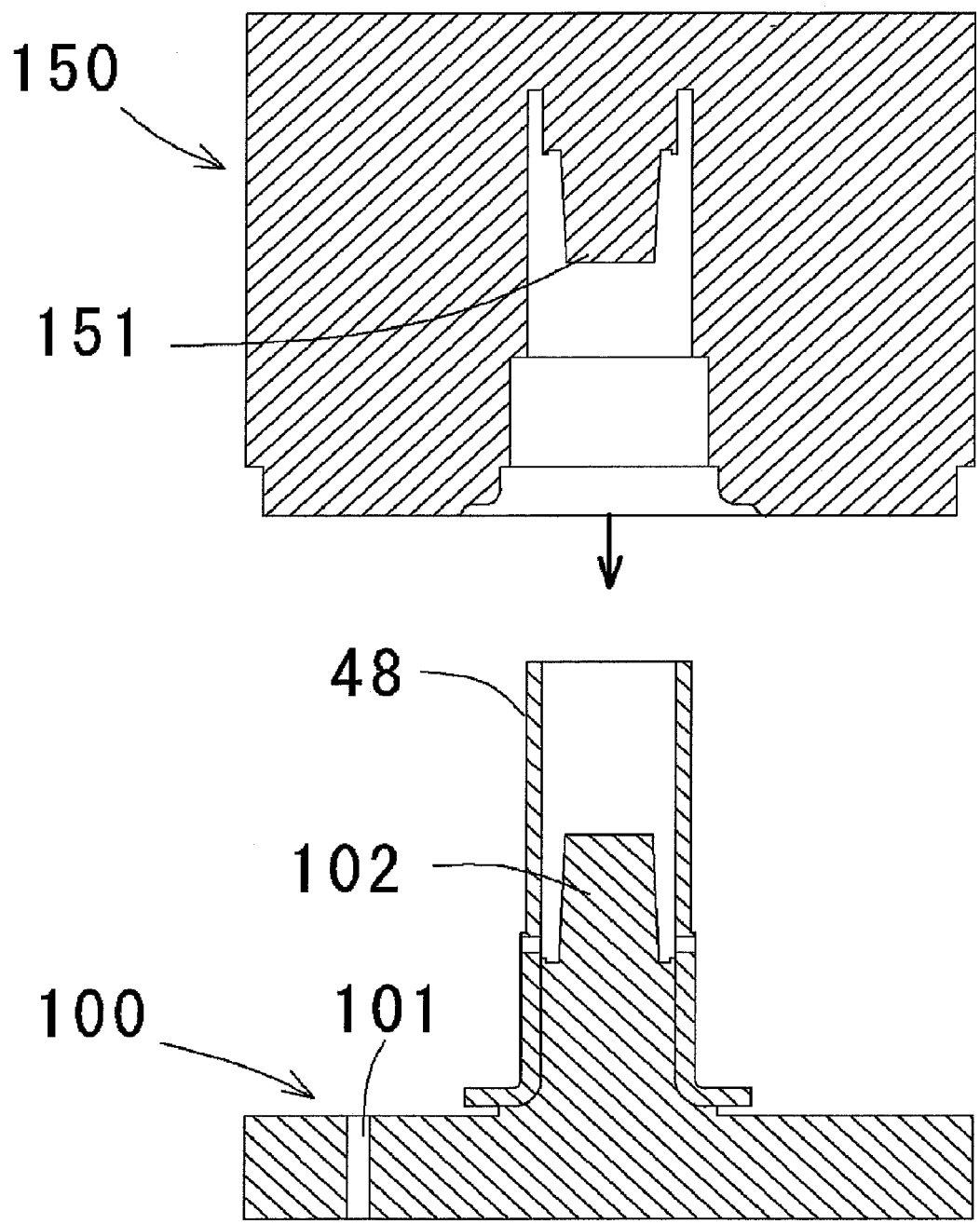
FIGS. 6 and 7 are sectional views each illustrating part of a bearing-retainer-unit molding process.
Figure 7:
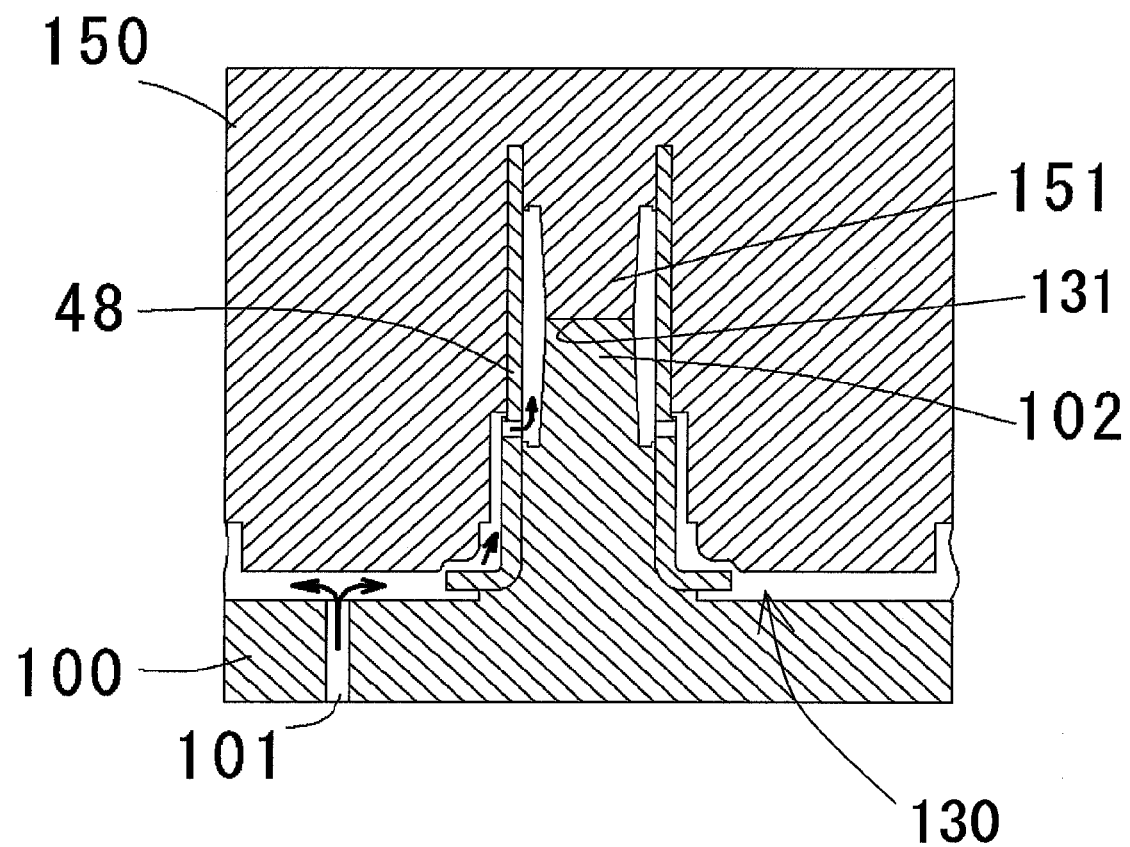

Next is a description of a method for producing the bearing retainer unit 2, with reference to FIG. 6 and FIG. 7. For the sake of convenience, the description is made with a movable die 150 used for the first die, and a stationary die 100 used for the second die. Also, a stationary die 100 may be used for the first die, and a movable die 150 used for the second die.

The movable die 150 is combined from above with the stationary die 100 in which the bearing bushing 48 is disposed, configuring an internal space 130 (see FIG. 7) between the dies 100 and 150. In FIGS. 6 and 7, die portions that correspond to the fan housing 21 and the linking portions 23 are not shown, for the sake of clarity of the figures.

Gates 101 are formed at a plurality of locations in the stationary die 100, and molten thermoplastic resin is injected through the gates 101. The gates 101 are located at positions where the motor support portion 22 is molded. The thermoplastic resin, which is a molten material injected from the gates 101, flows toward the fan housing 21, and toward the bearing positioning portion 6 via the communicating holes 48c of the bearing bushing 48. After the thermoplastic resin has hardened following injection, when the stationary die 100 and the movable die 150 are separated from each other, the bearing retainer unit 2 is held by the movable die 150 and attempts to separate from the stationary die along with the movable die 150. At this time, because an injector pin for separating the molded component is provided on the movable die 150, the bearing retainer unit 2 is separated from the movable die 150 by the injector pin. The bearing retainer unit 2 is held by the movable die 150 because the molded surface area of the movable die 150 is larger than the stationary die 100. The fan housing 21, the motor support portion 22, the molded cylinder portion 24, and the bearing positioning portion 6 are formed by insert-molding.

The stationary die 100 and the movable die 150 are provided with an upper conical frustum portion 151 and a lower conical frustum portion 102 that form the inner circumferential surface of the bearing positioning portion 6. By combining the stationary die 100 and the movable die 150, the upper conical frustum portion 151 and the lower conical frustum portion 102 make contact, forming an abutment 131. The upper conical frustum portion 151 and the lower conical frustum portion 102 each have a circumferential surface whose diameter is reduced closer to the abutment 131.

When the molten thermoplastic resin hardens, a parting line L2 (see FIG. 4) is formed on the smallest inner diameter portion of the inner circumferential surface of the bearing positioning portion 6, that is, on the bearing positing portion inner circumferential surface positioned outside in the radial direction of the abutment 131.

The stationary die 100 and the movable die 150 are shown as a single member, but they may also be configured separated into a plurality of members. For example, a configuration may be adopted in which the upper conical frustum portion 151 and the lower conical frustum portion 102 are divided for the stationary die 100 and the movable die 150. When it is desired to mold a bearing retainer unit in which the arrangement of the upper bearing and the lower bearing is modified, because it is possible to produce the bearing retainer unit by only exchanging the dies of the upper conical frustum portion and the lower conical frustum portion, the bearing retainer unit can be produced inexpensively. A molten material is not limited to thermoplastic resin; it may also be metal such as aluminum or zinc.

The bearing positioning portion 6 is formed as a cylinder that is comparatively long in the axial direction. Thus, the inner circumferential surface of the bearing positioning portion 6 is formed by the circumferential surface of the upper conical frustum portion 151 and the lower conical frustum portion 102. Thus, compared to a case in which the inner circumferential surface of a length in the direction of the axis that is the same as that of the bearing positioning portion is formed with one die, it is possible to shorten the respective lengths of the upper conical frustum portion 151 and the lower conical frustum portion 102 in the direction of the axis.

Accordingly, when separating the bearing retainer unit 2 from the dies, the relative moving distance of the upper conical frustum portion 151 and the lower conical frustum portion 102 relative to the dies 100 and 150 is shortened. Thus, even in the case of a bearing positioning portion with a comparatively small thickness in the radial direction, when separating the dies 100 and 150, it is possible to prevent molding defects wherein due to pulling on the dies 100 and 150 the bearing positioning portion is peeled off or broken.

The relative moving distance of the upper conical frustum portion 151 and the lower conical frustum portion 102 when separating the dies 100 and 150 can be made short in a case in which the smallest inner diameter portion on the inner circumferential surface of the bearing positioning portion is formed in the center of the inner circumferential surface of the bearing positioning portion in the direction of the axis, but according to the molding circumstances it is not necessary for the smallest inner diameter portion on the inner circumferential surface of the bearing positioning portion to be formed in the center.

An upper reduced diameter inner circumferential surface 65 and a lower reduced diameter inner circumferential surface 66 of the bearing positioning portion 6 have a diameter that is reduced closer to the abutment 131 between the upper conical frustum portion 151 and the lower conical frustum portion 102, and thus in comparison to the case of molding inner circumferential surfaces with the same inner diameter, there is little frictional force between the molded faces (the upper reduced diameter inner circumferential surface 65 and the lower reduced diameter inner circumferential surface 66) and the die faces (the circumferential surface of the lower conical frustum portion 102 and the circumferential surface of the upper conical frustum portion 151) that acts when separating the dies. Thus, because the load that acts on the bearing positioning portion 6 when separating the dies is small, it is possible to prevent molding defects wherein the bearing positioning portion 6 is peeled off or broken.

The bearing bushing 48 is provided with the flange portion 48b and thus has high rigidity. Moreover, rigidity is high because the dimensions of the lower portion of the bearing bushing 48 in the axial direction are comparatively thick. Thus, even if the injection pressure when performing injection molding is high, the bearing bushing 48 is not easily deformed. If a high injection pressure can be used, fluidity of the injected thermoplastic resin becomes good, and it is possible to improve the quality of the molded components.

The external-air exposed portion 48e of the bearing bushing 48 is used as a face for axial positioning when the bearing bushing 48 is disposed in the stationary die 100. The bottom face of the flange portion 48b that forms the external-air exposed portion 48e is used as a reference surface during press-forming of the bearing bushing 48. Thus, because the planarity of the external-air exposed portion 48e is favorable, by using the external-air exposed portion 48e as the positioning face, it is possible to dispose the bearing bushing 48 in the stationary die 100 with good precision. As a result, in the bearing retainer unit 2 there is good squareness of the bearing bushing 48 in the horizontal direction. Even in the case that the bottom face of the flange portion is not used as the reference face when performing press processing for the bearing bushing, because the flange portion is present, the bearing bushing is stable when disposed in the stationary die, and squareness is better than when the flange portion is not present.

The bearing positioning portion 6 and the motor support portion 22 are connected by the thermoplastic resin filled inside the plurality of communicating holes 48c. Thus, even when the bearing bushing 48 is pressured by the molding material when injection molding is performed and attempts to move, the thermoplastic resin in the communicating holes 48c resists, so that such movement can be prevented. Also, even assuming that a load from the upper bearing 46 and the lower bearing 47 in the direction of the axis, which acts on the bearing positioning portion 6 after assembly of the fan motor A, exceeds the fixing force of the bearing bushing 48 and the bearing positioning portion 6, the bearing positioning portion 6 is held by the thermoplastic resin filled into the communicating holes 48c, so it is possible to prevent the bearing positioning portion 6 from falling out from the bearing bushing 48.

As shown in FIG. 3, the communicating holes 48c have a hole shape that is a flat oval in the direction of the axis. With such an oval shape, it is possible to reduce the hole height of the communicating holes 48c in comparison to a true circle or an oval that is flat in the rotational direction with the same opening area. Accordingly, it is possible to dispose the cylinder-portion upper edge portion 24a of the motor support portion 22 lower.

Figure 8A:
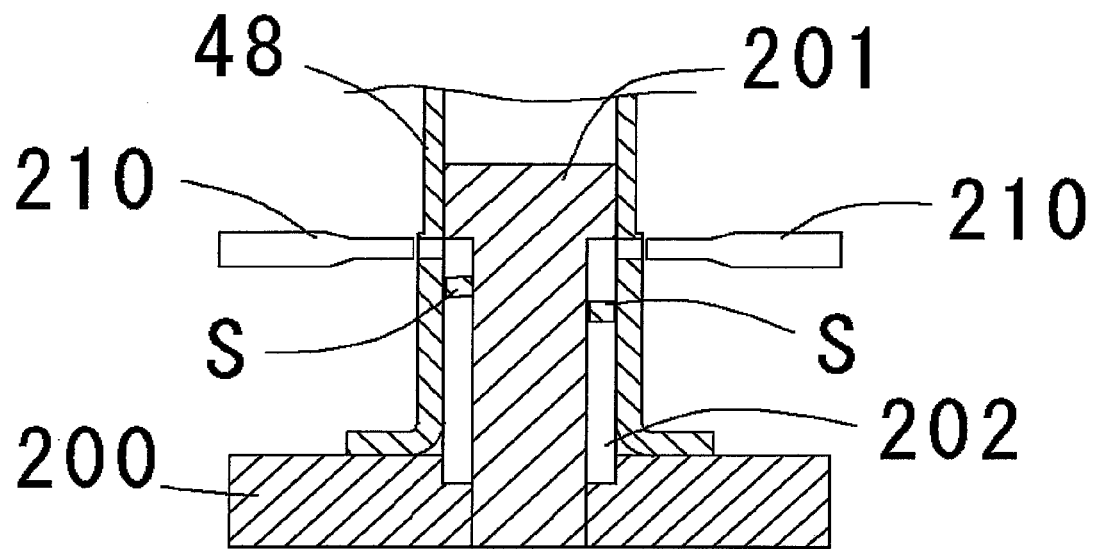
FIG. 8A is a vertical sectional view and FIG. 8B is a horizontal sectional view.
Figure 8B:
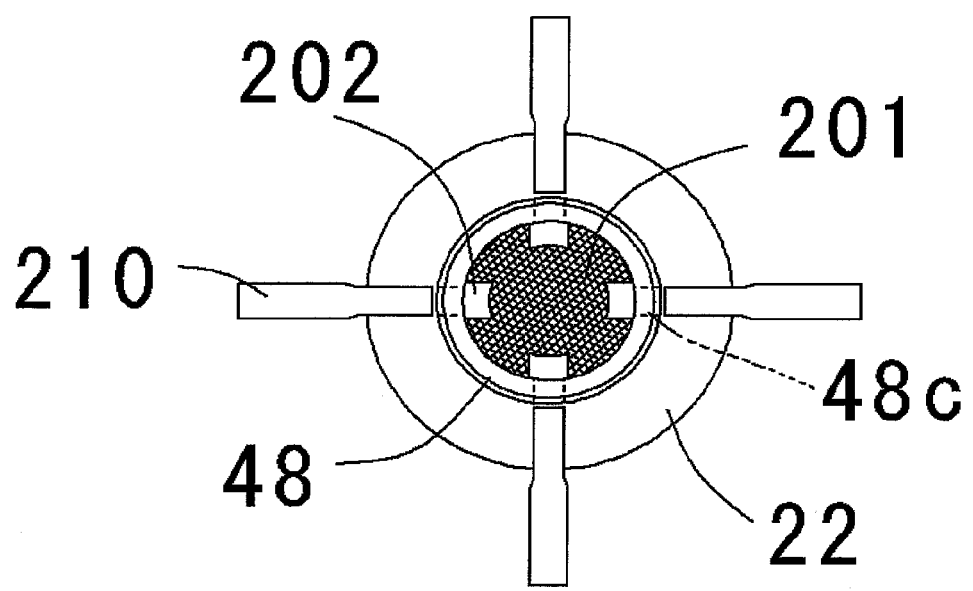

As shown in FIG. 8A, a method for processing four communicating holes 48c includes, with a columnar portion 201 of a die 200 inserted into and closely fit to the bearing bushing 48, pressing punches 210 from the outer circumferential side of the bearing bushing 48 toward the inside in the radial direction, thus forming the communicating holes 48c. As shown in FIG. 8B, this hole processing step is performed twice for each group of two communicating holes 48c that face each other among the four communicating holes. As shown in FIG. 8A, in the columnar portion 201, in the outer circumferential surface, vertical grooves 202 for peeling away removed fragments formed when processing the communicating holes 48c are provided at four places in locations that correspond to the communicating holes 48c.

As shown in FIG. 8B, with respect to the processing procedure, first one group of communicating holes 48c facing left and right in FIG. 8B are processed, and afterward a group of communicating holes 48c facing up and down in FIG. 8B are processed. That is, communicating holes 48c in four locations are processed with the processing divided into two instances. There are two reasons for following this sort of procedure.

The first reason is to prevent a removed fragment S that has been removed by the punches 210 from interfering with a removed fragment S of other communicating holes 48c, and thus causing defects during processing. That is, when a plurality of the communicating holes 48c are processed at the same time, the smaller the interval between each adjacent communicating hole 48c, the greater the risk that those removed fragments S will lie in between the bearing bushing 48 and the columnar portion 201, causing a defect to occur in which the bearing bushing 48 cannot be removed from the die 200. Thus, by making the interval between the plurality of communicating holes 48c processed at the same time as large as possible, it is possible to prevent the aforementioned defects. In the present embodiment, one group of communicating holes 48c that are processed at the same time, are arranged opposing each other centered around the rotational axis L1 (180 degree interval in the direction of rotation), so they have the most separated positional relationship possible.

The second reason is in order to suppress a reduction in circularity of the bearing bushing 48 accompanying hole processing. Because stresses act on the bearing bushing 48 from opposing radial directions centered around the rotational axis L1, those stresses are cancelled. Moreover, because the directions of the stress that acts during the first instance and second instance of processing are offset from each other by 90 degrees in the rotational direction, stress that acts during the second instance of processing corrects deformities that occurred during the first instance of processing, and as a result the amount of deformation of the bearing bushing 48 is reduced.

For the above reasons, with the present embodiment, the mechanism that positions the pair of bearings 46 and 47 in the bearing bushing 48 is provided at the same time as injection molding of the bearing retainer unit 2, so not only is it possible to realize cost reductions due to reduced man-hours, it is also possible to realize dramatic cost reductions due to forming the bearing bushing 48 with press processing.

At this time, with a configuration that provides a mechanism that positions a pair of bearings in for example a bearing bushing by plastic deformation in press processing, there are the disadvantages that it is difficult to elicit precision of the positioning face where the bearings are positioned, and that the circularity of the bearing bushing decreases. Thus, it is not possible to assemble a motor with high precision. In order to address these conventional problems, in the present embodiment, a mechanism that positions the pair of bearings 46 and 47 at predetermined positions is formed by the injection molded bearing positioning portion 6 as described above. Moreover, the bearing positioning portion 6 is provided with the upper reduced-diameter inner circumferential surface 65 and the lower reduced-diameter inner circumferential surface 66, and the upper recess 63 and the lower recess 64, and formed such that the parting line L2 is positioned in approximately the center of the bearing positioning portion 6, and thus molding defects are prevented.

Also, the bearing bushing 48 is provided with the flange portion 48b, and so there is good squareness relative to the horizontal face of the bearing retainer unit 2, so that the molding precision is improved. Thus, the pair of bearings 46 and 47 can be installed in the bearing positioning portion 6 with good precision, with the result that it is possible to improve rotational precision of the motor. Also, the flange portion 48b is strongly supported by the motor support portion 22, and thus it is possible to prevent defects during rotation such as tilting or breaking of the bearing bushing 48.

For the above reasons, with the present embodiment, it is possible to realize a fan motor A that has low cost and rotates with high precision.

Second Embodiment

Figure 9:
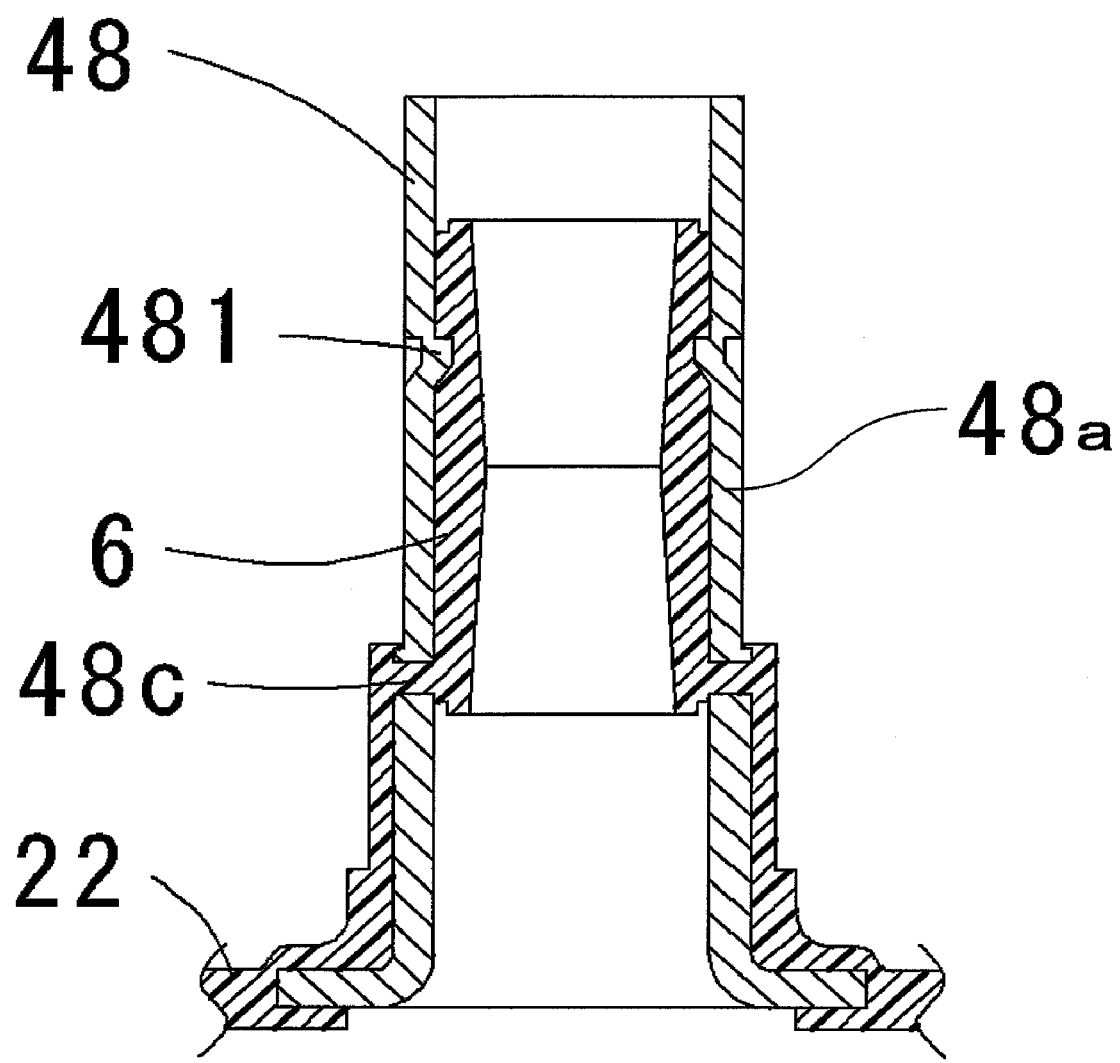
FIG. 9 is a key-portion sectional view that illustrates a motor bearing-retainer unit according to a second embodiment of the present invention.

As shown in FIG. 9, formed in the cylinder portion 48a that faces the bearing positioning portion 6 in the radial direction is a ridge 481 that protrudes inside in the radial direction from the inner surface of the cylinder portion 48a. The ridge 481, in a manner similar to the function of the aforementioned communicating holes 48c, prevents movement of the bearing bushing 48 when molding the bearing retainer unit 2, and can improve the fixing force of the cylinder portion 48a and the bearing positioning portion 6. Because the operating effects of the aforementioned communicating holes 48c and the operating effects of the ridge 481 are both obtained in this configuration, it is suitable for, for example, a fan motor in which a great load acts on the bearings than in the first embodiment.

The ridge 481 can be formed by pressing that presses from the outer circumferential surface of the cylinder portion 48a toward the inside in the radial direction, and is preferably provided at a plurality of locations in the inner circumferential surface of the cylinder portion 48a.

In the case of this configuration, although there is concern that the circularity of the bearing bushing 48 will be degraded, because the ridge 481 is formed at a position separated from the pair of bearings 46 and 47, even if the circularity is off, there is almost no effect on the precision of installation of the pair of bearings 46 and 47 with respect to the bearing positioning portion. Also, the ridge 481 does not require the same precision as the positioning face for performing positioning of the pair of bearings 46 and 47, and so it is not accompanied by cost increases due to high precision processing.

A furrow (not shown) that is hollow from the inner surface of the cylinder portion 48a to the outside in the radial direction may also be formed. Also, it is possible to obtain the same effects by roughly forming the inner surface of the cylinder portion 48a using blast processing.

Also, because the fixing force of the bearing bushing 48 and the resin is improved and movement by the molding material during injection molding is prevented, penetrating holes or notches may be provided, or surface treatment that increases the face roughness may be performed, such that resistance of the surface of the flange portion 48b of the bearing bushing 48 to a molten material increases.

Third Embodiment

Figure 10:
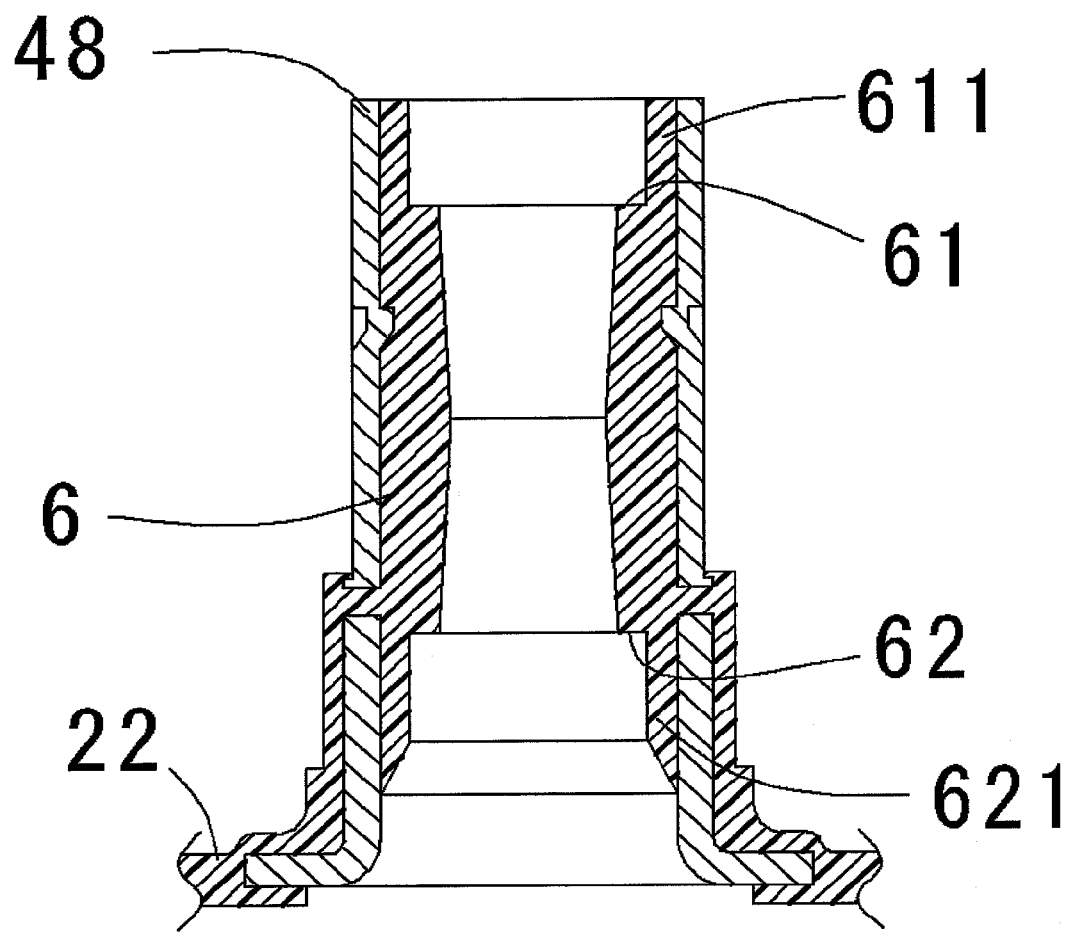
FIG. 10 is a key-portion sectional view that illustrates a motor bearing-retainer unit according to a third embodiment of the present invention.

As shown in FIG. 10, an upper outer wall portion 611 extended upward from the upper edge portion 61 and having a cylindrical shape that covers the inner surface of the bearing bushing 48 is formed in the outer edge portion of the upper edge portion 61 of the bearing positioning portion 6. Also, a lower outer wall portion 621 extended downward from the lower edge portion 62 and having a cylindrical shape that covers the inner surface of the bearing bushing 48 is formed in the lower end portion of the bearing positioning portion 6.

The upper edge portion 61 of the bearing positioning portion 6 makes contact with the lower end portion of the upper bearing 46, and the inner circumferential surface of the upper outer wall portion 611 makes contact with the outer circumferential portion of the upper bearing 46. The lower edge portion 62 of the bearing positioning portion 6 makes contact with the upper end portion of the lower bearing 47, and the inner circumferential portion of the lower outer wall portion 621 makes contact with the upper end portion of the lower bearing 47.

With this configuration, the upper edge portion 61 and the upper outer wall portion 611 are formed as a single body from the same material, so no border appears in the outer edge portion of the upper edge portion 61 between the bearing positioning portion 6 and the bearing bushing 48. This is also true for the outer edge portion of the lower edge portion 62.

Accordingly, because burrs do not occur in the outer edge portion of either the upper edge portion 61 and the lower edge portion 62, it is possible to perform positioning of the upper bearing 46 and the lower bearing 47 without providing the upper recess 63 and the lower recess 64 described in the first embodiment. Because a change in dimensions relative to the first embodiment occurs to the extent of the dimensions in the radial direction of the upper outer wall portion 611 and the lower outer wall portion 621, it is necessary, for example, to increase the diameter of the bearing bushing 48 or to decrease the diameter of the pair of bearings 46 and 47.

Fourth Embodiment

Figure 11A:
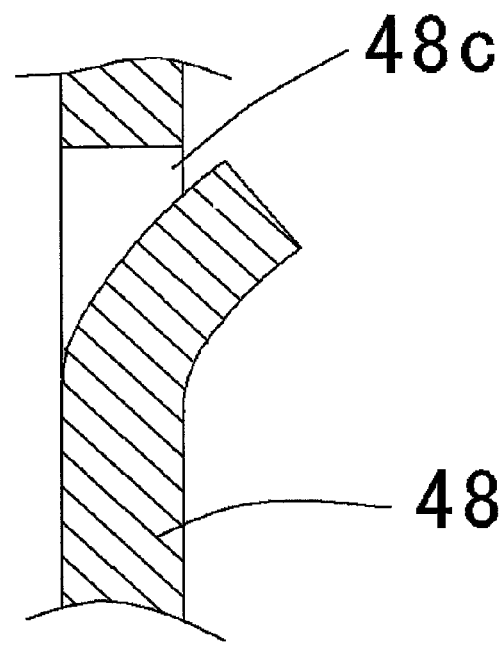
FIG. 11A is a vertical sectional view and FIG. 11B is a horizontal sectional view.
Figure 11B:
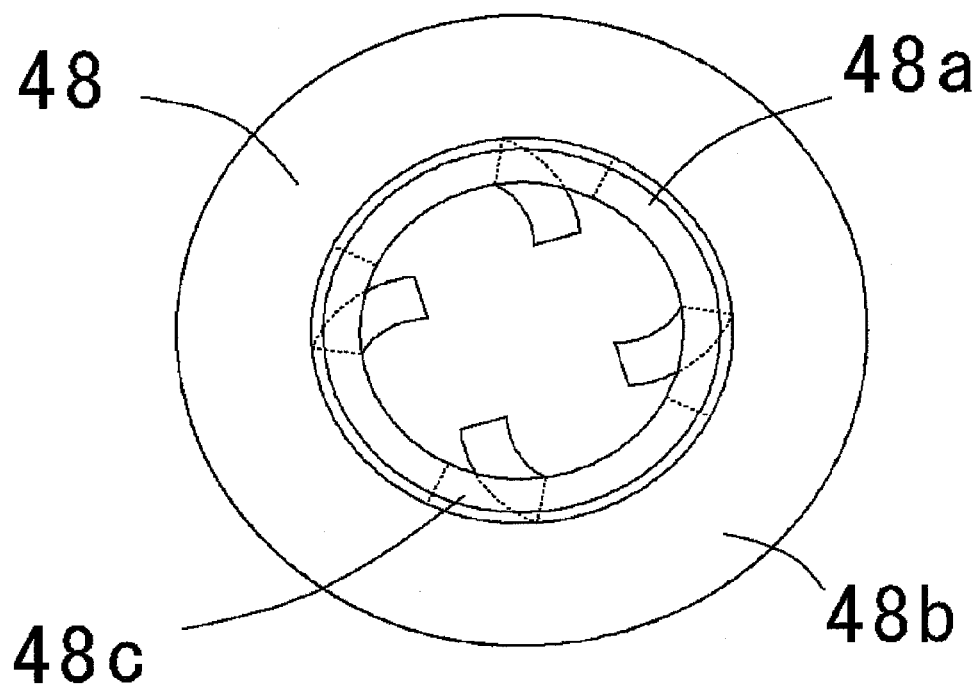

As shown in FIG. 11, the communicating holes 48c of the bearing bushing 48 are not limited to an oval shape as described in the first embodiment; they may be circular or rectangular, and they are not limited to four in number. Also, a configuration may be adopted in which the communicating holes 48c are not made to penetrate by removing part of the bearing bushing 48, but as shown in FIG. 11A, part of the bearing bushing 48 is cut open and modified so as to extend inside in the radial direction, or as shown in FIG. 11B, part of the bearing bushing 48 is cut open and modified inside in the radial direction and in the direction of rotation. In either case, it is possible to modify the flow direction in which a molten material flows from the communicating holes 48c. In addition, because the circumferential edge of the communicating hole 48c protrudes in the radial direction, it is possible to improve the fixing force of the bearing positioning portion 6.

Fifth Embodiment

Figure 12:
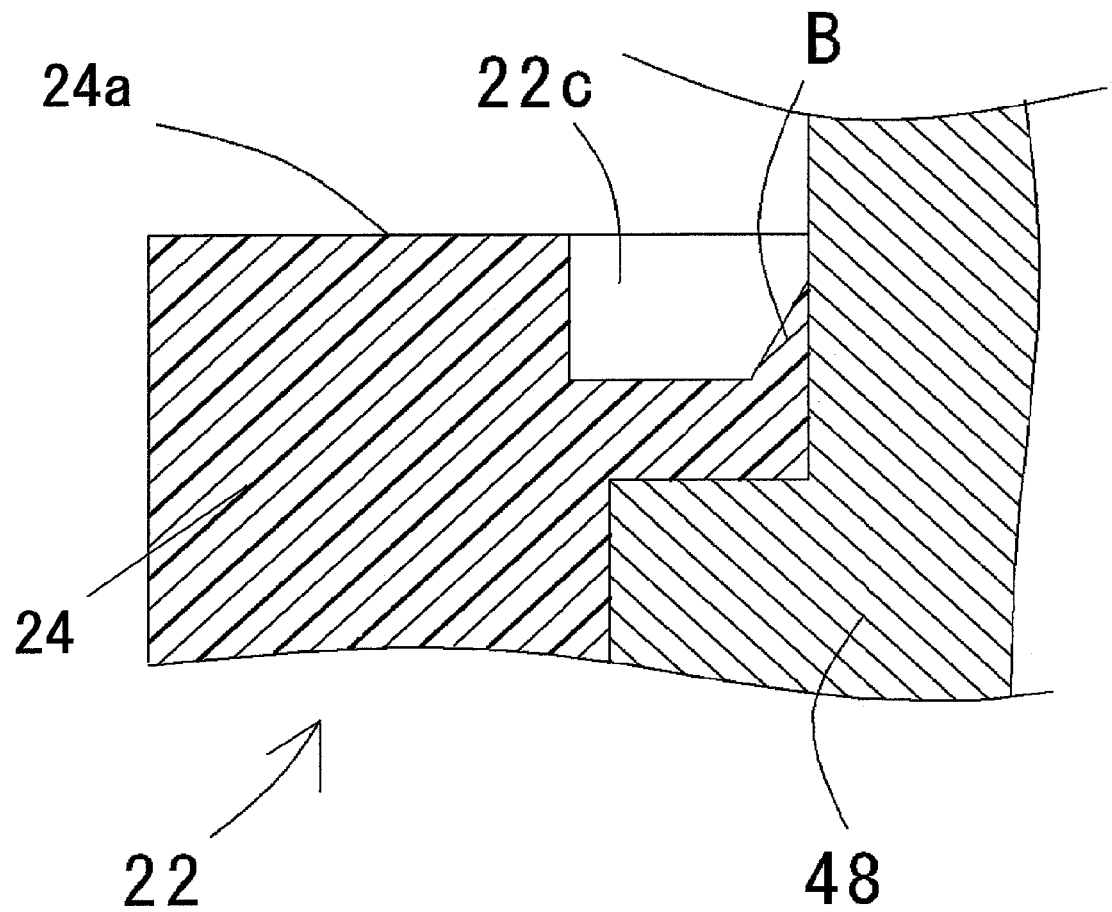
FIG. 12 is a key-portion, enlarged sectional view of a motor bearing-retainer unit according to a fifth embodiment of the present invention.

In the present embodiment, as illustrated in FIG. 12, a cylinder portion recess 22c that indents downward from a cylinder-portion upper edge portion 24a is formed in the inner circumferential margin of the cylinder-portion upper edge portion 24a of the molded cylinder portion 24.

In the inner circumferential portion of the bottom face of the cylinder portion recess 22c, a burr B is formed extended upward from the bottom face and with a length that does not protrude from the cylinder-portion upper edge portion 24a. With this configuration, it is possible to prevent positioning errors of the stator 45 due to the burr B making contact with the stator 45. That is, it is possible to position the stator 45 in the cylinder-portion upper edge portion 24a with high precision.

The cylinder portion recess 22c can be used as a collection groove for adhesive when fixing the stator 45.

Sixth Embodiment

Figure 13:
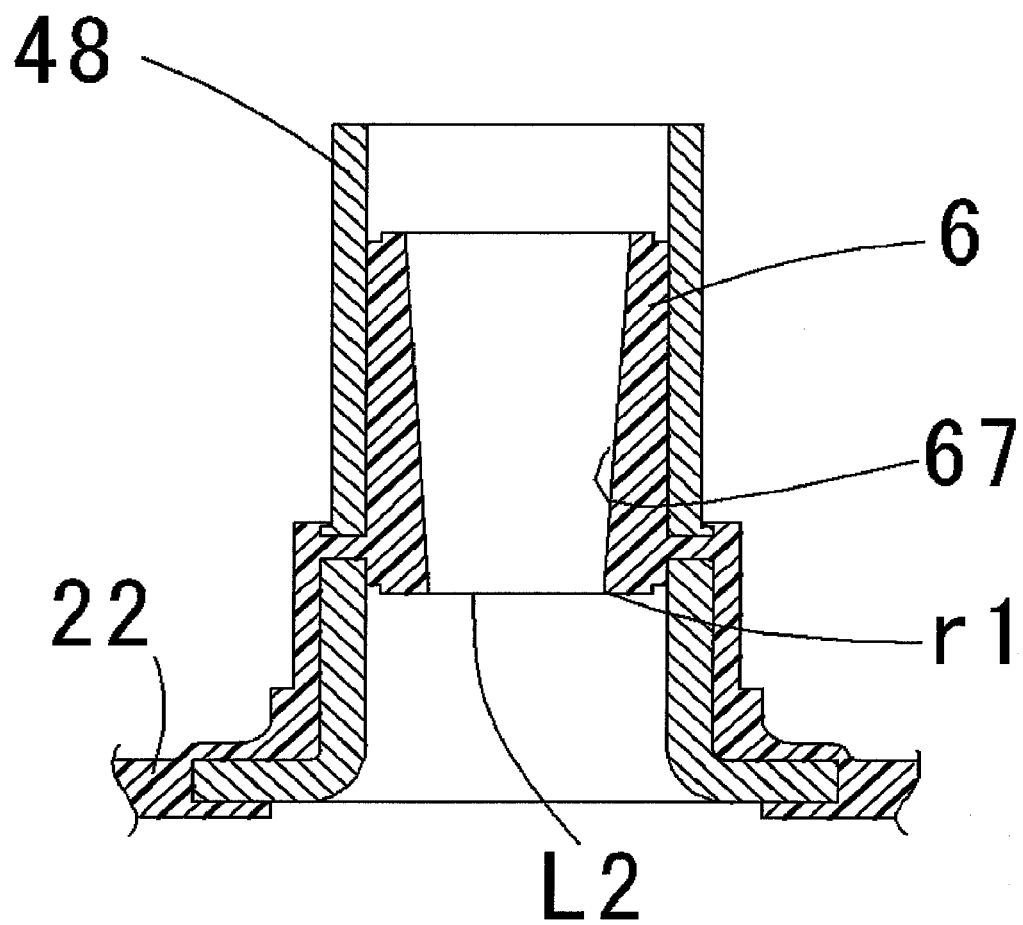
FIG. 13 is a sectional view of a motor bearing-retainer unit according to a sixth embodiment of the present invention.

As shown in FIG. 13, a smallest inner diameter portion r1 of the bearing positioning portion 6 is formed in the lower end portion of the inner circumferential surface of the bearing positioning portion 6. That is, the inner circumferential surface of the bearing positioning portion 6 is a reduced diameter inner circumferential surface 67 whose diameter is reduced from the upper end portion toward the lower end portion.

The movable die of this embodiment is provided with a circumferential surface whose diameter is reduced toward the abutment of the movable die and the stationary die. The reduced diameter inner circumferential surface 67 is formed by the circumferential surface of a single die. Also, a parting line L2 is formed in the lower end portion of the reduced diameter inner circumferential surface 67 positioned outside in the radial direction of the abutment.

In this embodiment as well, the reduced diameter inner circumferential surface 67 is formed such that its inner diameter is enlarged in the direction that the movable die separates from the stationary die (upward in FIG. 13), so the load that acts on the bearing positioning portion when separating the movable die is small, and thus it is possible to prevent molding defects such as the bearing positioning portion peeling or breaking.

Although omitted from the figures, the smallest inner diameter portion can also be formed in the upper end portion of the inner circumferential surface of the bearing positioning portion. In this case, the inner circumferential surface of the bearing positioning portion has a shape whose diameter decreases from the lower end portion toward the upper end portion.

Seventh Embodiment

Figure 14:
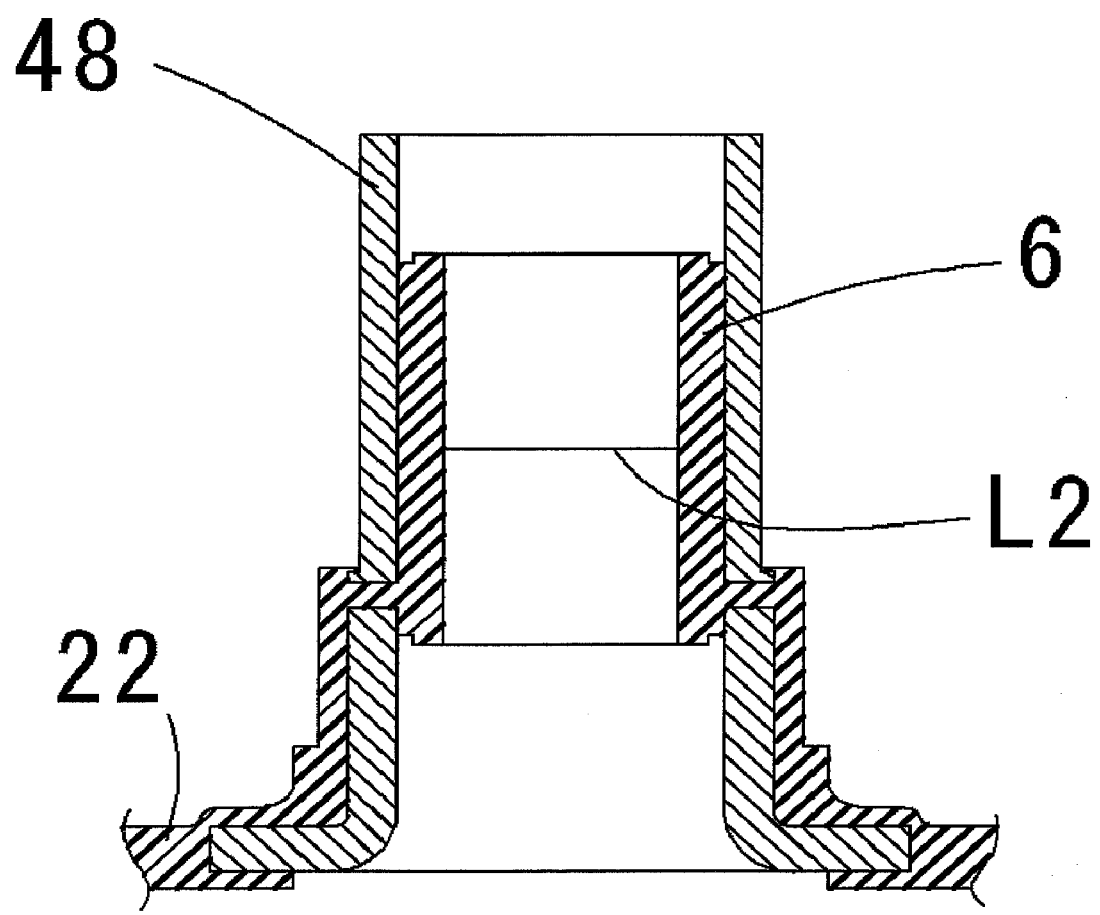
FIG. 14 is a sectional view of a motor bearing-retainer unit according to a seventh embodiment of the present invention.

As shown in FIG. 14, the bearing positioning portion 6 has a uniform inner diameter in the direction of the axis, and the parting line L2 is formed at a position sufficiently separated from the upper end portion and the lower end portion of the bearing positioning portion 6 in the direction of the axis.

When forming the parting line L2 in any of the upper end portion and the lower end portion of the bearing positioning portion, the movement distance that the movable die separates relative to the stationary die after injection molding is increased, so molding defects are more likely to occur in the bearing positioning portion.

On the other hand, in the present embodiment, because the inner circumferential surface of the bearing positioning portion is formed by two dies, it is possible to shorten the movement distance of the respective dies, so it is possible to prevent molding defects even in the case of a bearing positioning portion having a uniform inner diameter.

Eighth Embodiment

In each of the embodiments described above a fan motor was given by way of example, but the motor of the present invention is also applicable to motors with other applications. For example, it is applicable to main motors for driving a driving portion in a piece of office equipment or the like, and to spindle motors or the like that drive a recording disk.

Figure 15:
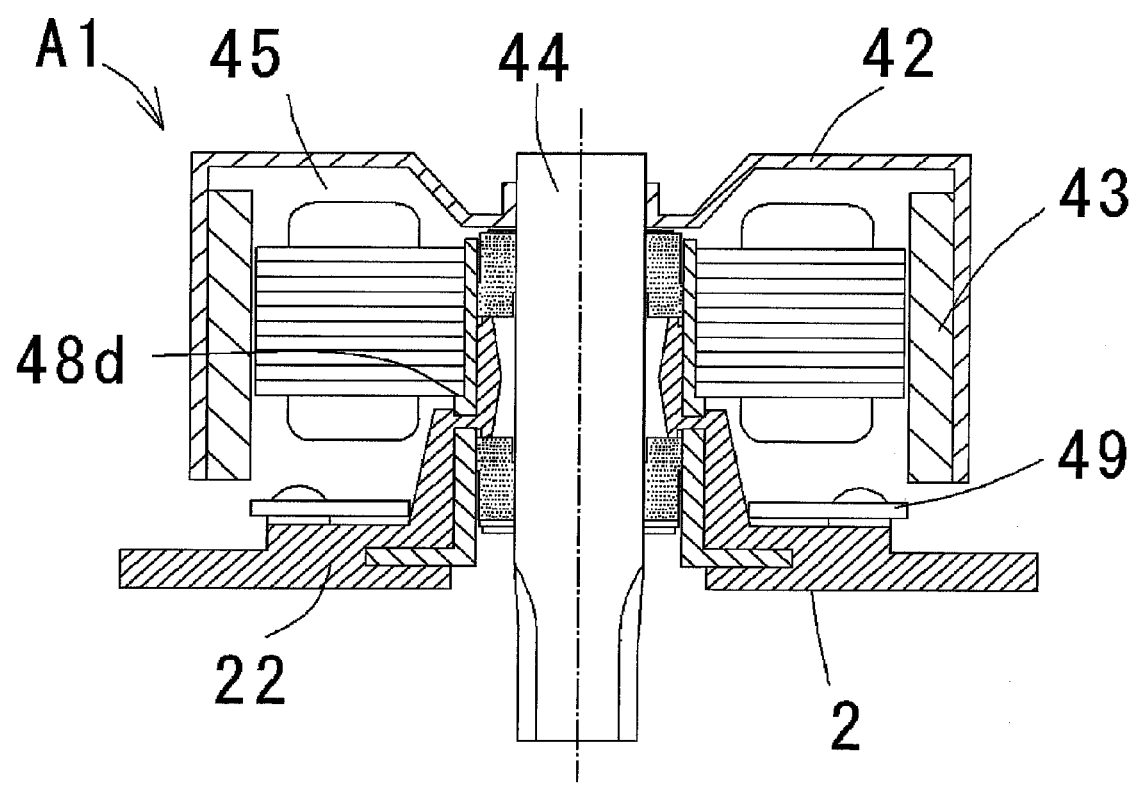
FIG. 15 is a sectional view of a motor according to an eighth embodiment of the present invention.

In the present embodiment, a main motor A1 in FIG. 15 is given as an example. The magnetic circuit portions of the main motor A1 are substantially the same as in the fan motor A of the first embodiment. The lower end portion of the shaft 44 is linked to the driving portion of a piece of office equipment, and transmits torque produced by the motor to that driving portion. The stator 45 is fixed in contact with the stepped portion 48d of the bearing bushing 48. The motor support portion 22 is formed as a single body with the bearing bushing 48, and is linked to the bearing positioning portion 6 via the plurality of communicating holes 48c. The motor support portion 22 of the main motor A1 is installed in a predetermined portion of the piece of office equipment using a fixing means such as a screw. The circuit board 49 is screwed to the motor support portion 22.

The bearing retainer unit 2 in the present embodiment is provided with the motor support portion 22, the bearing bushing 48, and the bearing positioning portion 6. Because it is necessary in the main motor A1 to configure the stationary section strongly, aluminum is used as a molten material when performing insert molding.

It is possible with this embodiment to obtain the same effects as each of the embodiments described above. Also, it is possible to apply each of the embodiments described above in the present embodiment.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A bearing retainer unit, for application in an electric motor furnished with a rotor that rotates centered on a rotational axis, the bearing retainer unit comprising:
   a metal bearing bushing of cylindrical form including a bushing inner surface and a bushing outer surface, and defining a communicating hole extending laterally therethrough and by which the inside and outside of the bushing communicate; and
   a molded part having a molded cylinder portion covering the bushing outer surface, a cylindrical bearing-positioning portion disposed inside of the bushing and covering the bushing inner surface, and a linking portion that closes off the communicating hole and links the molded cylinder portion and the bearing positioning portion,
   the cylindrical bearing-positioning portion having upper and lower end surfaces facing in opposite directions axially with respect to the cylindrical bearing-positioning portion, and frustum-shaped inner circumferential surfaces extending into the cylindrical bearing-positioning portion from the upper and lower end surfaces, respectively, the frustum-shaped inner circumferential surfaces meeting along a die-parting line which extends circumferentially along an axially inner part of the cylindrical bearing-positioning portion, and wherein the inner diameter of the cylindrical bearing-positioning portion is smallest at the die-parting line;
   whereby said molded part can be formed and integrated with said bearing bushing by an insert molding technique employing at least a pair of mold dies made up of a first die having a frustum-shaped outer circumferential surface corresponding to one of the inner frustum-shaped inner circumferential surfaces of said bearing positioning portion, and a second die having a frustum-shaped outer circumferential surface corresponding to the other of the inner frustum-shaped inner circumferential surfaces of said bearing positioning portion, such that
      positioning said bearing bushing in an inner space formed by the first and second dies, and closing the pair of dies to ready the mold positions an abutment of the first and second dies radially inward of said bearing bushing, and
      injecting a molten material into the inner space to form said molded part forms the die-parting line on the inner circumferential surface of said bearing positioning portion, at the radially outer side of the abutment.

2. A bearing retainer unit as set forth in claim 1, wherein said bearing bushing further comprises a flange portion extending radially outward from the bushing outer surface.

3. A bearing retainer unit as set forth in claim 2, wherein: said molded part, in continuity with said molded cylinder portion, further covers the top surface of, the outer circumferential surface of, and a part of the bottom surface of said flange portion; and an external-air exposed portion not covered by said molded part is formed on the bottom surface of said flange portion.

4. A bearing retainer unit as set forth in claim 1, wherein the bushing outer surface is formed to have a first outer face in which the through-hole is formed, and a second outer face of smaller diameter than the first outer face.

5. A bearing retainer unit as set forth in claim 1, wherein at least two communicating holes are formed in the bearing bushing, in diametrically opposed pairs formed at circumferentially equidistant separation centered on the rotational axis.

6. A bearing retainer unit as set forth in claim 1, wherein: either a ridge protruding radially inward from said bushing inner surface, or a furrow recessed radially outward into the bushing inner surface, is formed in the bushing inner surface; and by the ridge being covered by a molten material, the bearing positioning portion is interlocked with the ridge, or by the furrow being covered by a molten material, the bearing positioning portion interlocked with the furrow.

7. A bearing retainer unit as set forth in claim 1, wherein the bearing bushing is a press-worked piece of metal.

8. A bearing retainer unit as set forth in claim 1, wherein the bearing positioning portion comprises: a positioning upper-end surface and a positioning lower-end surface for carrying a pair of bearings; and outer wall portions axially extending respectively from the upper-end surface and from the lower-end surface and covering the bearing bushing inner surface.

9. A bearing retainer unit as set forth in claim 1, wherein said molded part is of a thermoplastic resin.

10. A bearing retainer unit as set forth in claim 1, wherein: the molded cylinder portion comprises a cylinder-portion upper edge portion for carrying a stator; and a cylinder portion recess indenting downward into the cylinder-portion upper-edge portion is formed along the inner circumferential margin of the cylinder-portion upper-edge portion.

11. A bearing retainer unit as set forth in claim 10, wherein a burr is formed in the cylinder portion recess, extending upward from the bottom surface of the cylinder portion recess and of a length that does not protrude beyond the cylinder-portion upper-edge portion.

12. An electric motor, comprising: a rotor furnished with a rotor magnet; a stationary section furnished with a bearing retainer unit as set forth in claim 1, and a stator opposing said rotor magnet; and a bearing mechanism retained on said bearing retainer unit, and rotatably supporting said rotor.

13. A bearing retainer unit as set forth in claim 1, wherein the die-parting line is located at approximately the axial center of the bearing-supporting portion of the molded part.

14. A bearing retainer unit as set forth in claim 1, wherein the upper and lower end surfaces of the bearing-supporting portion are spaced axially inwardly from ends of the metal bearing bushing.

15. A bearing retainer unit, for application in an electric motor furnished with a rotor that rotates centered on a rotational axis, the bearing retainer unit comprising:
  a metal bearing bushing of cylindrical form including a bushing inner surface and a bushing outer surface, and defining a communicating hole extending laterally therethrough and by which the inside and outside of the bushing communicate; and
  a molded part having a molded cylinder portion covering the bushing outer surface, a cylindrical bearing-positioning portion disposed inside of the bushing and covering the bushing inner surface, and a linking portion that closes off the communicating hole and links the molded cylinder portion and the bearing positioning portion,
  the cylindrical bearing-positioning portion having upper and lower end surfaces facing in opposite directions axially with respect to the cylindrical bearing-positioning portion, and an annular upper recesses extending in the outer periphery of the upper end surface, wherein the annular upper recess confronts the metal bushing inner surface;
  whereby said molded part can be formed and integrated with said bearing bushing by an insert molding technique employing at least a pair of mold dies made up of a first die having a first surface corresponding to one of the upper and lower end surfaces of the cylindrical bearing-positioning portion, and an outer circumferential surface projecting from the first surface and shaped to correspond to at least a portion of the inner circumferential surface of said bearing positioning portion, and a second die having a form including a second surface corresponding to the other of the upper and lower end surfaces of the cylindrical bearing-positioning portion, and wherein an upper one of the first and second mold dies is also made up of an annular projection extending from the surface thereof corresponding to the upper end surface of the cylindrical bearing-positioning portion, such that
    positioning said bearing bushing in an inner space formed by the first and second dies, and closing the pair of dies to ready the mold positions an abutment of the first and second dies radially inward of said bearing bushing, and
    injecting a molten material into the inner space to form said molded part forms the upper and lower end surfaces and the annular upper recess in the outer periphery of the upper end surface of the cylindrical bearing-positioning portion.

16. A bearing retainer unit as set forth in claim 15, wherein the molded part has a burr in the upper recess of said bearing-positioning portion, the burr extending upward from the bottom of the upper recess and of such a length that the burr does not protrude out of the upper recess beyond the upper end surface.

17. A bearing retainer unit as set forth in claim 15, wherein: said bearing positioning portion has a lower recess extending in the outer periphery of the lower end surface, wherein the annular lower recess also confronts the metal bushing inner surface.

18. A bearing retainer unit as set forth in claim 15, wherein the molded part has a burr is formed of said bearing-positioning-portion, the burr extending downward from the bottom of the lower recess and of such a length that does not protrude out of the lower recess beyond the lower end surface.

19. A bearing retainer unit as set forth in claim 15, wherein the bearing-positioning portion has inner circumferential surfaces meeting along a die-parting line which extends circumferentially along an axially inner part of said bearing-positioning portion, corresponding to a radially outer side of the abutment.

20. A bearing retainer unit as set forth in claim 15, wherein said molded part is of a thermoplastic resin.

21. An electric motor, comprising: a rotor furnished with a rotor magnet; a stationary section furnished with a bearing retainer unit as set forth in claim 15, and a stator opposing said rotor magnet; and a bearing mechanism retained on said bearing retainer unit, and rotatably supporting said rotor.

22. A bearing retainer unit as set forth in claim 15, wherein the upper end surface of the bearing-supporting portion is spaced axially inwardly from ends of the metal bearing bushing.

23. A bearing retainer unit as set forth in claim 22, wherein the lower end surface of the bearing-supporting portion is spaced axially inwardly from ends of the metal bearing bushing.

* * * * *